(12) United States Patent
Shi et al.

(10) Patent No.: US 12,483,809 B2
(45) Date of Patent: Nov. 25, 2025

(54) OPTICAL SENSING SYSTEM AND ANALOG-TO-DIGITAL CONVERTER

(71) Applicant: Silead Inc., Shanghai (CN)

(72) Inventors: Zhen Shi, Shanghai (CN); Shengrong Liu, Shanghai (CN)

(73) Assignee: Silead Inc., Shanghai (CN)

( * ) Notice: Subject to any disclaimer, the term of this patent is extended or adjusted under 35 U.S.C. 154(b) by 95 days.

(21) Appl. No.: 17/835,812

(22) Filed: Jun. 8, 2022

(65) Prior Publication Data

US 2023/0179886 A1 Jun. 8, 2023

(30) Foreign Application Priority Data

Dec. 2, 2021 (CN) .......................... 202111461027.7
Dec. 2, 2021 (CN) .......................... 202111473013.7

(51) Int. Cl.
*H04N 25/75* (2023.01)
*H03M 1/56* (2006.01)
*H04N 25/772* (2023.01)

(52) U.S. Cl.
CPC .............. *H04N 25/75* (2023.01); *H03M 1/56* (2013.01); *H04N 25/772* (2023.01)

(58) Field of Classification Search
CPC ........ H04N 25/75; H04N 25/772; H03M 1/56
See application file for complete search history.

(56) References Cited

U.S. PATENT DOCUMENTS

2006/0290552 A1 12/2006 Roh et al.
2007/0064836 A1 3/2007 Byrne et al.
(Continued)

FOREIGN PATENT DOCUMENTS

| CN | 109416737 A | 3/2019 |
|---|---|---|
| CN | 212810302 U | 3/2021 |
| CN | 212967703 U | 4/2021 |
| CN | 116233635 A | 6/2023 |

OTHER PUBLICATIONS

First Office Action and search report issued on Mar. 29, 2025 for counterpart Chinese patent application No. 202111473013.7,along with machine EN translation downloaded from EPO (22 pages).
(Continued)

*Primary Examiner* — Michael E Teitelbaum
(74) *Attorney, Agent, or Firm* — Nutter McClennen & Fish LLP

(57) ABSTRACT

The present disclosure relates to an optical sensing system and an analog-to-digital converter. The optical sensing system includes a ramp signal generator, a digital logic circuit and a plurality of column circuits. The ramp signal generator is configured to generate a ramp signal and transmit the ramp signal to the column circuits. The ramp signal includes a signal of which a signal intensity varies with time, and a signal intensity variation rate of the ramp signal corresponds to an amplification factor of a photosensitive electric signal. Each column circuit is configured to receive photosensitive electric signal, and output a photosensitive gain signal to the digital logic circuit according to ramp signal and photosensitive electric signal. Photosensitive gain signal includes a digital signal corresponding to photosensitive electric signal of which signal intensity is amplified. The digital logic circuit is configured to calculate a digital sampling signal according to photosensitive gain signals.

20 Claims, 17 Drawing Sheets

(56) References Cited

U.S. PATENT DOCUMENTS

| | | | |
|---|---|---|---|
| 2009/0167915 A1 | 7/2009 | Hirota et al. | |
| 2015/0138408 A1* | 5/2015 | Lee | H04N 25/78 |
| | | | 348/294 |
| 2016/0088248 A1 | 3/2016 | Lee et al. | |
| 2017/0280077 A1 | 9/2017 | Yun et al. | |
| 2018/0376081 A1* | 12/2018 | Ikuma | H04N 25/77 |
| 2019/0007637 A1* | 1/2019 | Nishikido | H04N 25/67 |
| 2020/0097699 A1 | 3/2020 | Zeng et al. | |

OTHER PUBLICATIONS

Du Shuchun, Mixed programming practice of microcontroller C language and assembly language, Beihang University Press (2016) pp. 160-162.

Second Office Action and search report issued on Sep. 24, 2025 for counterpart Chinese patent application No. 202111473013.7, along with machine EN translation downloaded from EPO (12 pages).

* cited by examiner

OPTICAL SENSING SYSTEM AND ANALOG-TO-DIGITAL CONVERTER

CROSS-REFERENCE TO RELATED APPLICATIONS

This application claims priority to Chinese Patent Application No. 202111473013.7, filed on Dec. 2, 2021 and Chinese Patent Application No. 202111461027.7, filed on Dec. 2, 2021, which are hereby incorporated by reference in their entireties.

TECHNICAL FIELD

This disclosure relates to the technical field of optical sensing, and in particular to an optical sensing system and an analog-to-digital converter.

BACKGROUND

A CMOS image sensor (CIS) is used to generate corresponding electric signals according to light intensity, so as to realize optical sensing, which has been applied in both of camera modules and photosensitive modules. Especially in recent years, with the improvement of smart phones and other devices, the CMOS image sensor has been more and more widely used in the field of optical fingerprint recognition.

In the current CMOS image sensor, photoelectric conversion is performed in an exposure stage by a photodiode to generate signal charges, which are picked up by a MOSFET electrode gate and then converted into voltage signals. Then, a programmable gain amplifier (PGA) performs signal gain on the voltage signals to obtain a photosensitive voltage and a reset voltage respectively, and these two voltages are subtracted to obtain an analog signal correspondingly. The analog signal is analog-to-digital converted by an analog to digital converter (ADC) to finally obtain a digital signal for image processing.

However, in the above-mentioned structure, PGAs are required to be respectively arranged to perform signal gain processing on the photosensitive signals of each pixel unit when these photosensitive signals are processed, so that the PGAs corresponding to the pixel units increase the complexity of the circuit structure, and increase the area cost of the chip. In particular, when applied to a portable device such as a smart phone and a smart wearable device, the design of the device itself is relatively compact, so if the area of the corresponding optical sensing chip is too large, not only the design cost is increased, but also the operation rate of the chip is affected. Therefore, how to adjust the structure of the chip to downscale the chip area while ensuring the chip performance is an urgent problem to be solved at present.

In addition, in the process of performing an analog-to-digital conversion on the analog signal, a corresponding count value is obtained generally according to a result of comparison between an analog signal and a ramp signal, and then the count value is converted into a digital value, so as to realize the analog-to-digital conversion. However, the voltage values of different analog signals vary, and in order to ensure the accuracy of the comparison result, a higher requirement is put forward for the input common-mode range of a comparator. In this way, not only the difficulty in the design of the comparator is increased, but also the accuracy of the digital signal after the analog-to-digital conversion is difficult to be guaranteed, which affects the subsequent processing process. Therefore, there is an urgent need for a technical solution that can effectively ensure the analog-to-digital conversion effect in an optical sensor.

SUMMARY

It is an object of embodiments of this disclosure to provide an optical sensing system and an analog-to-digital converter to solve the technical problem of how to effectively reduce an area of an optical sensing chip and effectively ensure the effect of the analog-to-digital conversion.

In order to solve the above-mentioned technical problem, the embodiments of the disclosure provide an optical sensing system comprising a ramp signal generator, a digital logic circuit and a plurality of column circuits; wherein the ramp signal generator is configured to generate a ramp signal and transmit the ramp signal to the column circuits; the ramp signal comprises a signal of which a signal intensity varies with time, a signal intensity variation rate of the ramp signal corresponds to an amplification factor of a photosensitive electric signal; at least one of the plurality of column circuits is configured to receive the photosensitive electric signal, and output a photosensitive gain signal to the digital logic circuit according to the ramp signal and the photosensitive electric signal; the photosensitive gain signal comprises a digital signal corresponding to the photosensitive electric signal of which a signal intensity is amplified; and the digital logic circuit is configured to calculate a digital sampling signal according to the photosensitive gain signal.

Embodiments of the disclosure also provide an optical sensing system comprising a pixel array and at least one analog-to-digital conversion circuits; wherein the pixel array comprises a plurality of rows and columns of pixel units, the pixel units are configured to generate respective photosensitive electric signals according to optical signals that are received; the analog-to-digital conversion circuit comprises a ramp signal generator, a comparator module and a counting module, wherein the ramp signal generator is configured to generate a ramp signal and transmit the ramp signal to the comparator module, wherein the ramp signal comprises a signal of which a signal intensity varies with time, a signal intensity variation rate of the ramp signal corresponds to an amplification factor of a photosensitive electric signal; the comparator module is coupled to the photosensitive electric signal and the ramp signal, and an output signal of the comparator module is inverted when a difference between the ramp signal and the photosensitive electric signal changes to zero; the counting module obtains a first count value according to a duration from an initial time point when the ramp signal is generated to a time point when the comparator module is inverted, and outputs a first digital signal corresponding to the photosensitive electric signal according to the first count value.

Embodiments of the disclosure also provide a method for calculating a digital sampling signal, comprising the following steps of: generating a ramp signal by a ramp signal generator, the ramp signal comprising a signal of which a signal intensity varies with time, and a signal intensity variation rate of the ramp signal corresponding to an amplification factor of a photosensitive electric signal; transmitting, by the ramp signal generator, the ramp signal to column circuits; generating, by the column circuit, a photosensitive gain signal according to the ramp signal and the photosensitive electric signal, the photosensitive gain signal comprising a digital signal corresponding to the photosensitive electric signal of which a signal intensity is amplified;

transmitting, by the column circuit, the photosensitive gain signal to the digital logic circuit; and calculating, by the digital logic circuit, a digital sampling signal according to the photosensitive gain signal.

Embodiments of the disclosure also provide an analog-to-digital converter comprising a ramp signal generator, a comparator module and a counting module; wherein the ramp signal generator is configured to generate a ramp signal and transmit the ramp signal to the comparator module, wherein the ramp signal comprises a signal of which a signal intensity varies with time, and a signal intensity variation rate of the ramp signal corresponds to an amplification factor of a photosensitive electric signal; the comparator module is coupled to the photosensitive electric signal and the ramp signal, and is inverted when a difference between the ramp signal and the photosensitive electric signal changes to zero; the counting module obtains a first count value according to a duration from an initial time point when the ramp signal is generated to a time point when the comparator module is inverted, and outputs a first digital signal corresponding to the photosensitive electric signal according to the first count value.

It can be seen from the technical solution provided in the embodiments of the disclosure that, by the optical sensing system and the method for calculating a digital sampling signal described above, an amplification factor of the photosensitive electric signal is controlled based on a slope of the ramp signal generated by the ramp signal generator, such that the column circuit is capable of generating a photosensitive gain signal according to the ramp signal and the photosensitive electric signal, the amplification of the signal intensity can be achieved without additionally providing any PGA circuit, and the photosensitive gain signal can eventually be used to calculate a digital sampling signal to determine the corresponding optical signal intensity. In the above described system, the PGA circuit is removed while the signal amplification effect is obtained, and the structure of the optical sensing system is simplified, so that the area overhead of the chip corresponding to the optical sensing system can be reduced, the application scene of the corresponding optical sensor chip can be broaden, and the realization effect during the subsequent image processing can be ensured.

In addition, in the embodiments of the disclosure, after the photosensitive electric signal and the ramp signal are generated by the pixel array and the analog-to-digital conversion circuit, the comparator module adopts a manner of coupling the photosensitive electric signal and the ramp signal sequentially, such that a difference between the ramp signal and the photosensitive electric signal changes to zero and an output signal inversion occurs. There is no high relevancy between the voltage value of the input signal at the fixed end of the comparator module and the photosensitive electric signal and the ramp signal, it is thus possible to adjust an input signal voltage value corresponding to the time point at which the output signal is inverted based on the common-mode range of the comparator module, and it is possible to ensure that each signal inversion corresponds to the input signal voltage value. Correspondingly, the counting module is also capable of obtaining a first count value according to the duration from an initial time point when the ramp signal is generated to a time point when the comparator module is inverted, and outputting a first digital signal corresponding to the photosensitive electric signal based on the first count value, so as to achieve the analog-to-digital conversion. Through the optical sensing system described above, the design difficulty of the comparator module can be reduced, the accuracy of the analog-to-digital conversion process can be guaranteed, and the realization effect of the subsequent image processing can be ensured.

BRIEF DESCRIPTION OF THE DRAWINGS

To illustrate more clearly the embodiments in the disclosure or the technical schemes of the prior art, a brief description of the accompanying drawings in the embodiments or the prior art will be given below. Obviously, the accompanying drawings described below are only some embodiments described in this specification. For those of ordinary skill in the art, other drawings can also be obtained without any creative labor from these drawings.

DESCRIPTION OF EMBODIMENTS

Hereinafter the technical solution in the embodiments of the disclosure will be described clearly and integrally in combination with the accompanying drawings in the embodiments of the disclosure, and obviously the described embodiments are merely part of the embodiments, rather than all of the embodiments. Based on the embodiments of the disclosure, all other embodiments that are obtained by persons skilled in the art without making creative efforts shall fall within the protection scope of the disclosure.

Figure 1:
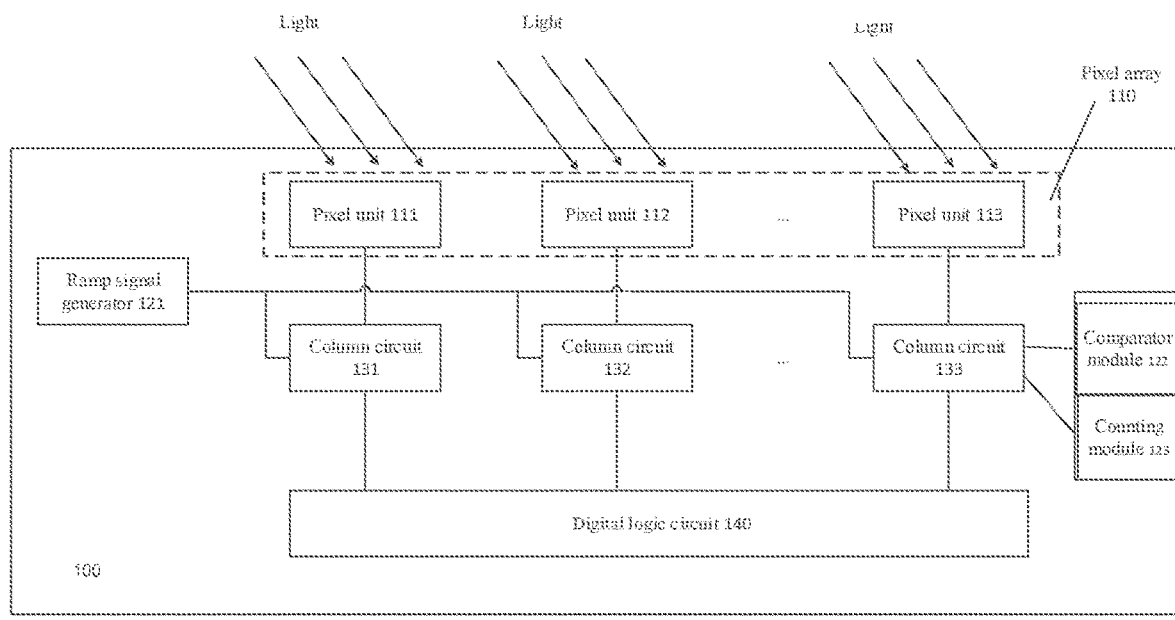
FIG. 1 is a structural schematic diagram of an optical sensing system according to an embodiment of the disclosure.

In order to solve the above technical problem, there is provided in embodiments of the disclosure an optical sensing system. As shown in FIG. 1, an optical sensing system 100 may include a ramp signal generator 121, a digital logic circuit 140, and a plurality of column circuits 131-133.

In some embodiments, the optical sensing system further comprises a pixel array 110. Specifically, the pixel units may be a pixel array 110 arranged in a form of a plurality of rows and columns. The pixel units are used to sense lights and generate corresponding electrical signals. As shown in FIG. 1, a case is exemplarily given in which pixel units 111, 112 and 113 are included in the optical sensing system. In practical applications, features such as the number and arrangement of the pixel units in the pixel array 110 may be set according to needs.

In the case where a plurality of rows and columns of pixel units are included in the pixel array 110, each column circuit in the optical sensing system may respectively correspond to one column of the pixel units in the pixel array 110. As shown in FIG. 1, the pixel units 111, 112, and 113 described above illustrate different columns in the pixel array 110 respectively, and correspond to column circuits 131, 132, and 133 respectively. It should be noted that columns which are used to describe the correspondence between the pixel units and the column circuits are just for better expression, and in practical applications, the arrangement direction of the pixel units corresponding to the column circuits is not limited.

When the pixel array 110 is exposed, there may be a certain difference in the lights received by each column of pixel units 111 to 113 in the pixel array 110 based on the scene corresponding to the array. Based on parameters such as the intensity and frequency of the lights, the signals generated by different pixel units will change correspondingly. After processing is performed based on the signals generated by the pixel units 111 to 113 in each column, the processed signals can be used for image processing to realize different functions such as photographing, fingerprint recognition, and light sensing.

In the embodiment of the disclosure, the pixel units 111 to 113 may generate corresponding photosensitive electric signals after receiving the optical signals. The photosensitive electric signals can be used to reflect the corresponding parameters of the lights. Photo Diodes (PDs) in the pixel units 111 to 113 generate signal charges based on the photoelectric conversion. After the end of the exposure, a transfer gate (TG) is opened so that the signal charges are transferred to a floating diffusion layer (FDL) to accumulate the signal charges which are then picked up by a MOSFET electrode gate, i.e., Source Follower (SF), that plays an amplifying role, and the charge signal is converted into a voltage signal, so as to obtain a photosensitive electric signal.

The specific manner and steps of generating the photosensitive electric signal by using the pixel units 111 to 113 may be set and adjusted according to the actual application, which are not limited to the above description and are not described herein.

In practical applications, in order to obtain lights, the pixel units 111 to 113 may also be provided with corresponding len modules based on a hierarchical structure, for example, the optical sensing system can be provided with physical lenses and filters etc. sequentially based on an up-down relationship, which are respectively used for light gathering and filtering. The specific application mode can be set according to the requirements of the actual application, and is not repeated herein.

It should be noted that, in practical applications, the pixel array 110 can be integrated in the optical sensing system, or the optical sensing system may exist as an independent signal processing module without including the pixel array 110. The specific application mode can be adjusted based on the requirements by those skilled in the art.

Figure 2:
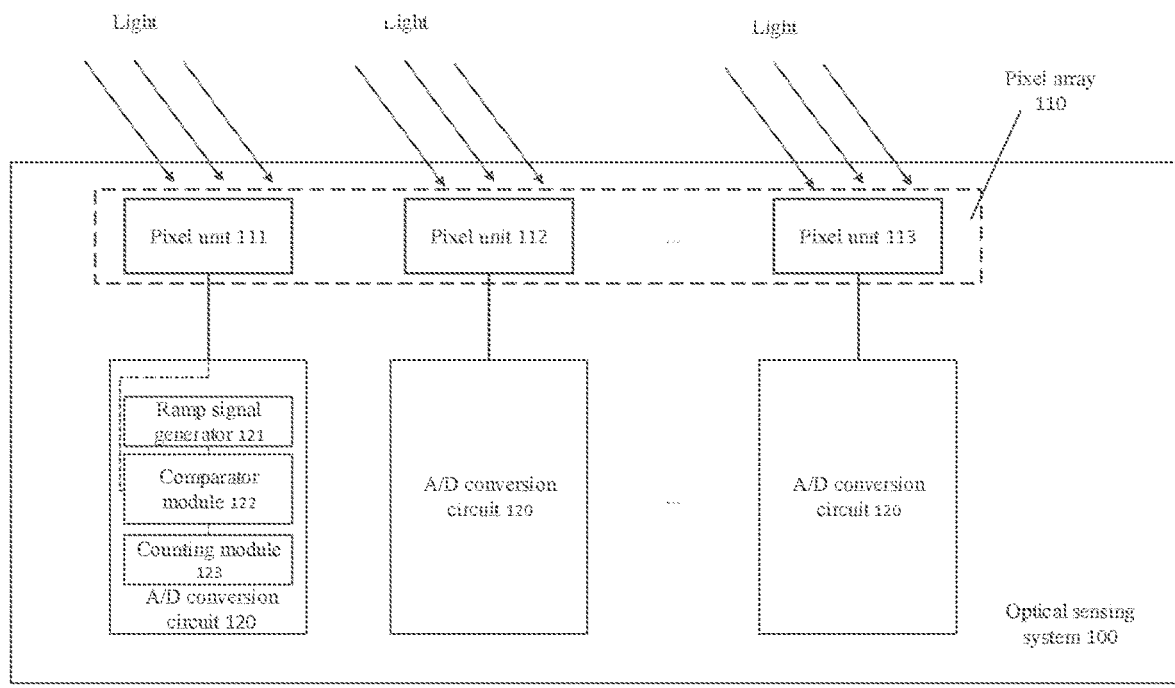
FIG. 2 is a structural schematic diagram of an optical sensing system according to an embodiment of the disclosure.

In some embodiments, the column circuits 131 to 133 and the ramp signal generator 121 constitute an analog-to-digital conversion circuit 120. The optical sensing system 100 may include at least one analog-to-digital conversion circuits 120, as shown in FIG. 2.

The analog-to-digital conversion circuit 120 is mainly used for performing analog-to-digital conversion on the photosensitive electric signal. The analog-to-digital conversion circuit 120 may include a ramp signal generator 121, a comparator module 122, and a counting module 123.

The ramp signal generator 121 is used to generate a ramp signal, which may be a time-varying signal, i.e., a signal varied over time. In the embodiment of this disclosure, a signal intensity variation rate of the ramp signal, which is varied over time, is used to adjust the amplification factor of the photosensitive electric signal. Preferably, a signal intensity of the ramp signal may vary over time at a fixed rate in order to facilitate controlling the amplification factor according to the rate at which the ramp signal varies, i.e., the signal intensity of the ramp signal and time may be in a relationship of linear function. In particular, the signal intensity of the ramp signal may be incremented or decremented over time, which is not limited herein. In practical applications, the signal intensity may in a form of a voltage value in order to facilitate calculation.

In some embodiments, a configuration register corresponding to the ramp signal generator 121 is included in the circuit (not shown), and corresponding parameter values may be pre-stored in the configuration register. The magnitudes of these parameter values can control the switching circuit in the ramp signal generator 121 to adjust the signal intensity variation rate of the generated ramp signal. In the case that the ramp signal generator 121 takes corresponding processing on an initial signal to determine an output ramp signal, the adjustment of the ramp signal is achieved by adjusting the preset parameter values in the configuration register, such that the slope of the output ramp signal can be changed based on the magnitudes of the parameter values.

In some embodiments, a capacitor(s) is provided in the ramp signal generator 121, and the capacitance value of the capacitor is used to adjust the signal intensity variation rate of the ramp signal.

In other embodiments, a current source(s) is provided in the ramp signal generator 121, and the signal intensity variation rate of the ramp signal can also be adjusted by adjusting a magnitude of a current output from the current source to the ramp signal generator 121.

Figure 3:
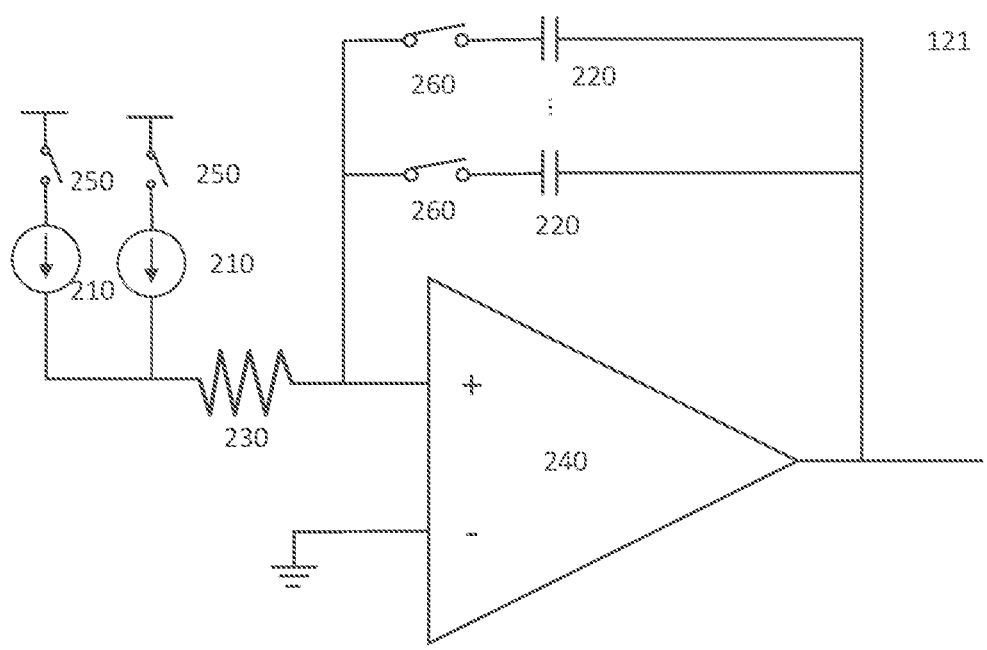
FIG. 3 is a structural schematic diagram of a ramp signal generator according to an embodiment of the disclosure.

The structure of the ramp signal generator 121 is further described using a specific example. FIG. 3 is a structural schematic diagram of a ramp signal generator 121. The ramp signal generator 121 includes a plurality of current sources 210, a plurality of capacitors 220, a resistor 230, a comparator 240, and a plurality of switches 250 and 260. Here, the structure of the ramp signal generator 121 may be a structure of an integrator whose output voltage is expressed as $$V_{out} = \frac{1}{RC} \int_t i(t)dt,$$

in which $V_{out}$ denotes a voltage (analog quantity) of the output ramp signal, R denotes a resistance value of the resistor 230, C is a value of total capacitance of the capacitor 220, i(t) denotes a value of total currents input to the ramp signal generator by several current sources 210, which in general is a constant value. In the case where the current i is a constant value, the integral over the constant is a linear function corresponding to time, so that the magnitude of the voltage of the output ramp signal is incremented or decremented at a fixed rate over time.

According to an embodiment of the disclosure, the switch 260 may be controlled according to the values of the configuration register in the digital circuit (not shown) to adjust the number of the switched-in capacitors 220, thereby adjusting the magnitude of the total capacitance value C, and the corresponding slope of the ramp signal can be changed. The switch 250 may also be controlled according to the values of the configuration register to adjust the number of the switched-in current sources 121 to control the magnitude of the current value, thereby changing the corresponding slope of the ramp signal, so as to adjust the signal intensity variation rate of the ramp signal.

In practical applications, one of the capacitance value C and the current value i may be selected to be adjusted, or both of the values may be combined to adjust the signal intensity variation rate of the ramp signal, which is not limited herein.

Based on the above description, in the optical sensing system, columns of pixel units 111 to 113 correspond to column circuits 131 to 133, respectively. After generating the photosensitive electric signals, the pixel units may transmit the photosensitive electric signals to the column circuits 131 to 133. Correspondingly, after generating the ramp signal, the ramp signal generator 120 may also transmit the ramp signal to the column circuits 131 to 133. In particular, the ramp signal may be transmitted to the comparator module 122 therein.

The column circuits 131 to 133 may output a photosensitive gain signal (a digital signal) after receiving the ramp signal and the photosensitive electric signal (an analog signal). The photosensitive gain signal includes a digital signal corresponding to the photosensitive electric signal of which a signal intensity is amplified. In the disclosure, after a photosensitive electric signal is obtained, the column circuits 131 to 133 may amplify the photosensitive electric signal while performing the analog-to-digital conversion on the photosensitive electric signal to obtain a corresponding digital signal (that is, a photosensitive gain signal). The conventional image sensor needs to firstly amplify the photosensitive electric signal which is an analog signal through a PGA circuit in operation, then calculate an analog quantity difference between the photosensitive electric signal and a reset electric signal, and finally perform the analog-to-digital conversion on the analog quantity difference. In another embodiment described later in this disclosure, the column circuits 131 to 133 may perform signal amplification and analog-to-digital conversion on the photosensitive electric signal. The column circuits 131 to 133 may also perform signal amplification and analog-to-digital conversion on the reset electric signal. The subsequent digital logic circuit 140 then directly obtains the difference between the digital signals to obtain a corresponding digital sampling signal.

In the embodiment of the present disclosure, the signal amplification is realized according to the slope of the ramp signal, therefore compared with the traditional CMOS image sensor, it is not necessary to additionally provide a PGA circuit in the column circuit to achieve the signal gain, thereby reducing the area overhead.

In some embodiments, each of the column circuits 131 to 133 includes a comparator module 122 and a counting module 230.

Figure 4:
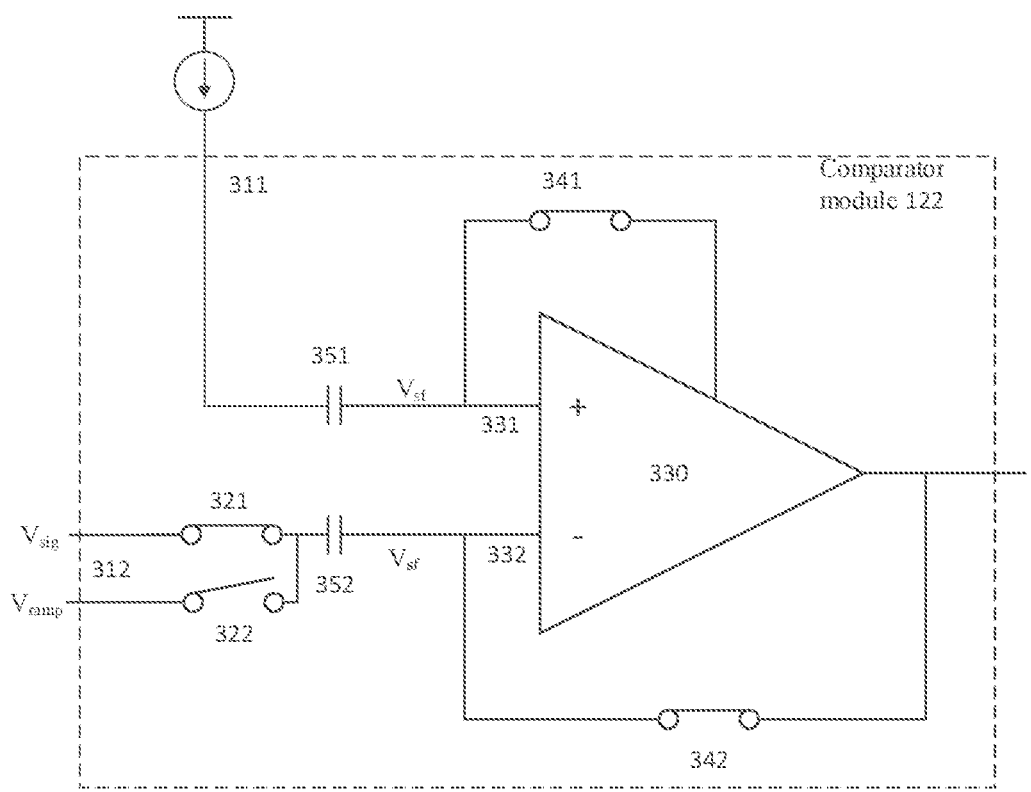
FIG. 4 is a structural schematic diagram of a comparator module according to an embodiment of the disclosure.
Figure 5:
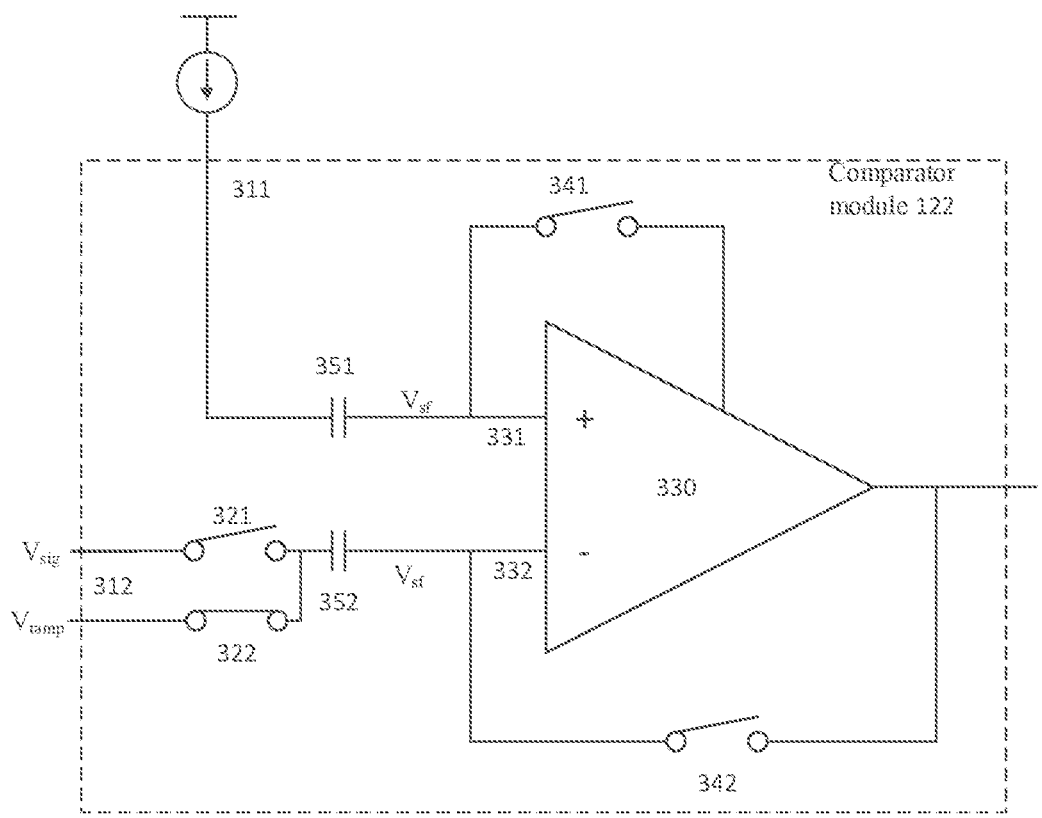
FIG. 5 is a structural schematic diagram of a comparator module according to an embodiment of the disclosure.

As shown in FIGS. 4 and 5, the comparator module 122 may compare the analog voltage values of the signals coupled to the two input ends, and the comparator module 122 may also continuously output a particular signal. Correspondingly, the two input ends of the comparator module respectively receive the ramp signal and the photosensitive electric signal that is generated by the pixel unit (such as the pixel unit 111) corresponding to the column circuit (such as the column circuit 131). When a voltage of the input ramp signal changes to be the same as the voltage of the photosensitive electric signal, the signal output by the comparator module is inverted, so as to indicate that the voltages of the two received signal are equal.

In the embodiments of the present disclosure, the comparator module 122 may be coupled to the photosensitive electric signal $V_{sig}$ and the ramp signal $V_{ramp}$ sequentially, and is inverted when a difference between the ramp signal $V_{ramp}$ and the photosensitive electric signal $V_{sig}$ changes to zero. In the prior art, the analog signal is directly compared with the ramp signal $V_{ramp}$ for analog-to-digital conversion. This configuration has a problem in that since the voltage value of the received photosensitive electric signal $V_{sig}$ is different every time the sampling is performed, a voltage value to which the capacitor connected to the comparator module 122 jumps is not a fixed amount, thus the flip point of the comparator module 122 is not fixed. This requires that the input common-mode range of the comparator module can cover all the cases, which increases the design difficulty of the comparator module.

In order to solve the above-mentioned problem, the comparator module 122 in the embodiments of the present disclosure may be coupled to the photosensitive electric signal $V_{sig}$ and the ramp signal $V_{ramp}$ sequentially. That is, the different input ends are not connected to the photosensitive electric signal $V_{sig}$ and the ramp signal $V_{ramp}$, respectively, such that when the signal voltages at the different input ends are the same, there is no high relevancy between the signal voltage and the photosensitive electric signal $V_{sig}$ or the ramp signal $V_{ramp}$, and the common-mode range of the comparator module can be adapted. Therefore, the design difficulty of the comparator module is reduced, while ensuring the accuracy of a result of the analog-to-digital conversion.

Based on the above description, the comparator module 122 may include a first input end 311 and a second input end 312, wherein the second input end 312 is configured for being coupled to the photosensitive electric signal $V_{sig}$ in a reset phase and being coupled to the ramp signal $V_{ramp}$ in a comparison phase, while the first input end 311 is coupled to a reference voltage $V_{ref}$ (a grounding or fixed level). The reference voltage $V_{ref}$ may be a voltage corresponding to a direct current voltage source, that is, the reference voltage $V_{ref}$ is a voltage having a constant voltage value. The comparator module 122 is inverted when a signal voltage coupled to the second input end 312 changes to be the same as a voltage at the first input end 311. That is, the comparator module 122 is always inverted when both of the voltage values at the first input end 311 and the second input end 312 equal to a voltage value of the reference voltage $V_{ref}$. When the voltage value of the reference voltage $V_{ref}$ can be adjusted based on the DC voltage source, the effective operation of the comparator module 122 can be more ensured.

The comparator module 122 further includes a first self-biasing switch 341, a second self-biasing switch 342, a first converting switch 321, and a second converting switch 322.

In the reset phase of the comparator module 122, as shown in FIG. 4, the first self-biasing switch 341 and the second self-biasing switch 342 are turned on so that the first input end 311 is coupled to the reference voltage $V_{ref}$, and the first converting switch 321 is turned on and the second converting switch 322 is turned off so that the second input end 312 is coupled to the photosensitive electric signal $V_{sig}$.

In the comparison phase of the comparator module 122, as shown in FIG. 5, the first self-biasing switch 341 and the second self-biasing switch 342 are turned off, the first converting switch 321 is turned off, and the second converting switch 322 is turned on, so that the second input end 312 is coupled to the ramp signal $V_{ramp}$.

The self-biasing switches and the converting switches described above are used to control an access signal of the comparator module, so as to enable correlation and comparison between the signals.

In practical application, in the comparison stage, if the signal input to the comparator module 122 is only adjusted from the photosensitive electric signal $V_{sig}$ to the ramp signal $V_{ramp}$, the adjusted signal does not have a necessary correlation with the photosensitive electric signal $V_{sig}$, and there is no corresponding correlation between the comparison result and the optical signal. Accordingly, in some embodiments, the comparator module 122 may further include a comparator 330, a first capacitor 351, and a second capacitor 352. Unlike the input end of the comparator module, the comparator may further include a third input end 331 and a fourth input end 332. The first capacitor 351 is coupled between the first input end 311 and the third input end 331 of the comparator 330, and the second capacitor 352 is coupled between the second input end 312 and the fourth input end 332 of the comparator 330.

In the reset phase, the first electrode plate of the first capacitor 351 is coupled to a bias voltage $V_{sf}$, the second electrode plate of the first capacitor is coupled to a reference voltage $V_{ref}$, the first electrode plate of the second capacitor 352 is coupled to the bias voltage $V_{sf}$, and the second electrode plate of the second capacitor 352 is coupled to the photosensitive electric signal $V_{sig}$. Specifically, the first electrode plate of the first capacitor 351 is coupled to the third input end 331 of the comparator 330, and the second electrode plate of the first capacitor 351 is coupled to the first input end 311 of the comparison module 122. The first electrode plate of the second capacitor 352 is coupled to the fourth input end 332 of the comparator 330, and the second electrode plate of the second capacitor 352 is coupled to the second input end 312 of the comparator module 122.

In the comparison phase, the signal of the first electrode plate and the signal of the second electrode plate in the first capacitor 351 remain unchanged, and the second electrode plate of the second capacitor 352 is switched to be coupled to the ramp signal $V_{ramp}$, then the signal coupled to the first electrode plate of the second capacitor 352 is switched to the bias voltage $V_{sf}$ plus a difference between the ramp signal $V_{ramp}$ and the photosensitive electric signal $V_{sig}$, that is, a signal corresponding to the fourth input end 332 of the comparator 330. When the signal at the fourth input end 332 changes to be equal to a fixed voltage to which the third input end 331 is coupled, the comparator 330 is inverted.

In the following, the structure and operation principle of the comparator module 122 are described by using a specific example with reference to the drawings.

FIG. 4 shows a structural schematic diagram of the comparator module 122 in the reset phase, wherein in the reset phase, the first input end 311 of the comparison module 122 is connected to a DC power supply corresponding to a reference voltage $V_{ref}$, and the second input end 312 is connected to the photosensitive electric signal $V_{sig}$. Here, the photosensitive electric signal $V_{sig}$ and the ramp signal $V_{ramp}$ correspond to the first converting switch 321 and the second converting switch 322, respectively. The comparator 330 in the comparator module includes the third input end 331 and the fourth input end 332. Here, the first input end 311 and the third input end 331 are connected to a left electrode plate (i.e., a second electrode plate of the first capacitor 351) and a right electrode plate (e.g., a first electrode plate of a first capacitor 351) of the first capacitor 351, respectively. The second input end 312 and the fourth input end 332 are connected to a left electrode plate (i.e., a second electrode plate of the second capacitor 352) and a right electrode plate (e.g., a first electrode plate of the second capacitor 352) of the second capacitor 352, respectively.

The comparator module 122 is connected to the photosensitive electric signal $V_{sig}$ in the reset phase, i.e., in the reset phase, the first self-biasing switch 341 and the second self-biasing switch 342 are turned on for eliminating the self-misalignment, while the first converting switch 321 is turned on and the second converting switch 322 is turned off, then the photosensitive electric signal $V_{sig}$ is input into the comparator module 122. FIG. 5 is a structural schematic diagram of the comparator module in the comparison phase in which the first self-biasing switch 341 and the second self-biasing switch 342 are turned off, while the first converting switch 321 is turned off and the second converting switch 322 is turned on, then the ramp signal $V_{ramp}$ is input to the comparator module 122.

In FIG. 4 and FIG. 5, a positive end of the comparator serves as the third input end, and a negative end thereof serves as the fourth input end, which is not limited in practical applications.

In the reset phase of the comparator module 122, a voltage of the second electrode plate of the first capacitor 351 is a reference voltage $V_{ref}$, and the specific value of the reference voltage $V_{ref}$ may be a zero level or may be a positive level, a negative level or the like, which is not limited thereto. The second electrode plate of the second capacitor 352 is a voltage value $V_{sig}$ of the photosensitive electric signal $V_{sig}$. The first electrode plates of the first capacitor 351 and the second capacitor 352 may be coupled to a bias voltage $V_{sf}$, provided that the value of the bias voltage is also $V_{sf}$. At the end of the reset phase, the first self-biasing switch 341 and the second self-biasing switch 342 are turned off, and since there is no other charge discharging pathway, the voltages of the first electrode plates of the first capacitor 351 and the second capacitor 352 are remained at the bias voltage $V_{sf}$.

When entering the comparison phase, the signal of the second input end 312 of the comparator module 122 is switched to the ramp signal $V_{ramp}$ through the first converting switch 321 and the second converting switch 322, the second electrode plate of the second capacitor 352 has a corresponding voltage value that jumps from $V_{sig}$ to an initial voltage value $V_{ramp}$ start of the ramp signal $V_{ramp}$. Since the self-biasing switch is turned off at this time, the first electrode plate of the second capacitor 352 has no charge discharging pathway, and thus changes according to the voltage change value of the second electrode plate. Since the second electrode plate of the second capacitor has a voltage change value of $V_{ramp\_start}-V_{sig}$, at the initial time of the comparison phase, the voltage value of the first electrode plate of the second capacitor jumps to $V_{sf}+(V_{ramp\_start}-V_{sig})$. The voltage value of the first electrode plate of the capacitor 351 does not change after entering the comparison phase, and is still a reference voltage $V_{ref}$ which has a fixed level, therefore, the voltage of the second electrode plate of the first capacitor 351 does not change either and is remained at the bias voltage $V_{sf}$.

Figure 6:
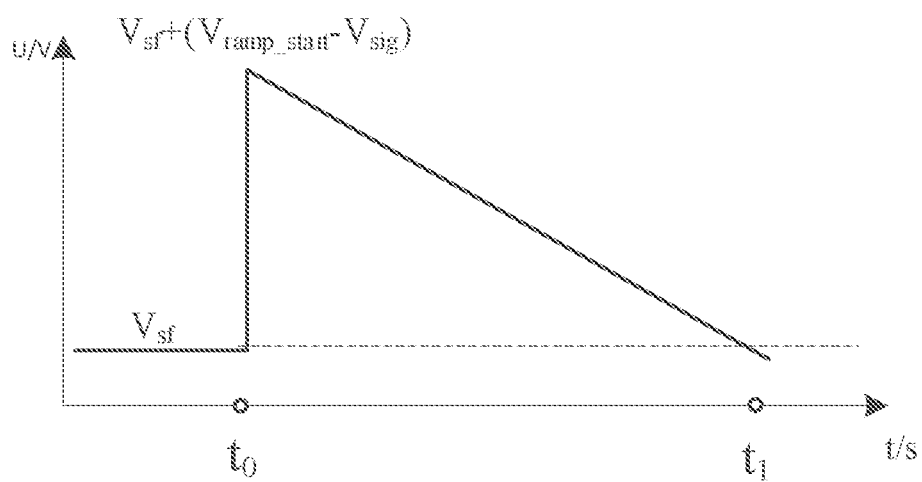
FIG. 6 is a schematic diagram illustrating voltage change of signals corresponding to a second electrode plate of a second capacitor according to an embodiment of the disclosure.

Since the ramp signal $V_{ramp}$ is a time-varying signal, thereafter, the first electrode plate of the second capacitor 352 varies based on the ramping (i.e., ramp up or ramp down) of the ramp signal $V_{ramp}$. FIG. 6 is a schematic diagram illustrating the voltage value of the first electrode plate of the second capacitor 352 (i.e., the voltage value at the second input end 312 of the comparator module 122) varying over time. Here, the solid line represents the voltage value of the first electrode plate of the second capacitor 352 (i.e., the voltage value at the second input end 312 of the comparator module 122). When the voltage value of the ramp signal $V_{ramp}$ ramps down to a certain time point $t_1$ over time, the voltage value of the first electrode plate of the second capacitor 352 (i.e., the voltage value at the second input end 312 of the comparator module 122) drops to the bias voltage $V_{sf}$. Since the voltage value of the right electrode plate of the first capacitor 351 (i.e., the voltage value at the first input end 311 of the comparator module 122) is fixed to $V_{sf}$, the voltage values at the positive and negative ends of the comparator module 122 are the same at this time, i.e. $V_{sf}+(V_{ramp}-V_{sig})=V_{sf}$. It can be seen that the inversion must occur at the time point when $V_{ramp}=V_{sig}$, and at that time point, the level of the output signal of the comparator is inverted.

In the embodiment in which a photosensitive electric signal $V_{sig}$ and a ramp signal $V_{ramp}$ are connected to the same input end of the comparator module 610 in respective phases, since the comparator module 122 always inverts the level of the output signal based on the same voltage value point (i.e., the dotted line in FIG. 7 remains unchanged), the common-mode input range of the comparator module 122 is greatly reduced, and the design difficulty is reduced.

In practical application, in order to ensure the accuracy of the calculation result, the analog signal can also be amplified, and then the amplified signal is subjected to analog-to-digital conversion. In the embodiments of the present disclosure, the analog-to-digital conversion circuit 120 can also convert the photosensitive electric signal $V_{sig}$ into a digital signal that is equivalently amplified, so that it is not necessary to additionally arrange a PGA circuit to amplify the analog signal, thereby achieving the effect of reducing the chip area.

In particular, signal amplification may be achieved based on the signal intensity variation rate of the ramp signal $V_{ramp}$.

The principle of signal amplification using the signal intensity variation rate of the ramp signal $V_{ramp}$ is described below with reference to the specific structure of the comparator module 122. For ease of illustration, the signal input through one input end of the comparator module 122 in this example is the photosensitive electric signal $V_{sig}$, the signal input through the other input end is the ramp signal $V_{ramp}$, and the bias voltage $V_{sf}$ is set to 0. It is to be understood that, when applied to the structure of the comparator model in the embodiments of this disclosure, only the image change relationship in this example is adjusted, and the principle thereof is still applicable.

Figure 7:
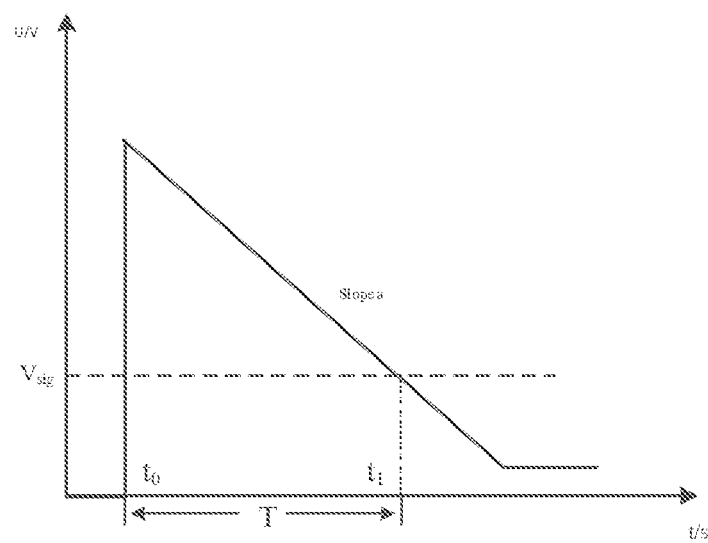
FIG. 7 is a schematic diagram of change of an original signal according to an embodiment of the disclosure.

FIG. 7 shows a schematic diagram of the voltage change of the input signal of the comparator module 122 corresponding to the input end of the ramp signal $V_{ramp}$ without processing the photosensitive electric signal $V_{sig}$. For convenience of description, the rate at which the ramp signal $V_{ramp}$ varies with time is expressed as a slope here. As shown in FIG. 7, the slope at which the ramp signal $V_{ramp}$ changes is a. A reset phase is a phase before the time point $t_0$, and the comparison phase starts at the time point $t_0$. After entering the comparison phase, the time T elapses, the signal voltages at the two input ends of the comparator module are equal, and the output signal of the comparator module 122 is inverted.

Figure 8:
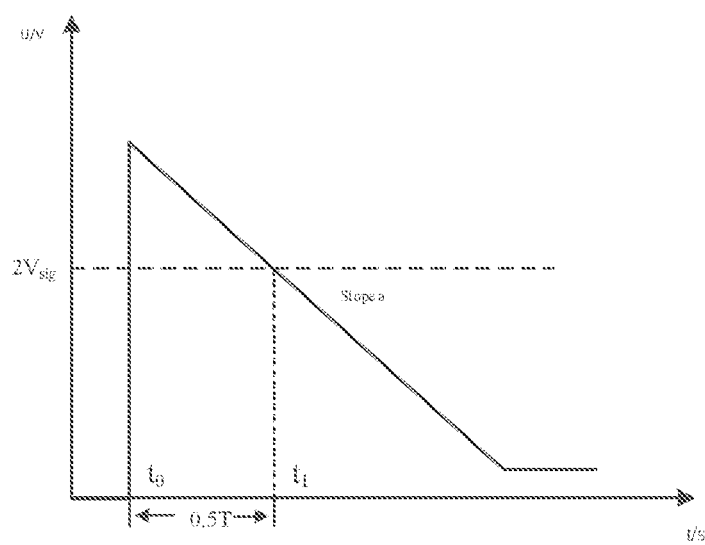
FIG. 8 is a schematic diagram of change of an amplified signal according to an embodiment of the disclosure.

FIG. 8 shows a schematic diagram of the voltage change of the input signal of the comparator module 122 corresponding to the input end of the ramp signal $V_{ramp}$ after the voltage value of the photosensitive electric signal $V_{sig}$ is amplified by two times by the PGA circuit in a conventional manner. It can be seen that the signal voltages at the two input ends of the comparator module 122 are equal after the time 0.5 T elapses. The counter starts counting at an initial time point $t_0$ when the ramp signal $V_{ramp}$ is generated, and stops counting at a time point $t_1$ when the output signal of the comparator module 122 is inverted, to obtain a count value, and output a photosensitive gain signal according to the count value. The duration of time between the time point to and the time point $t_1$ corresponds one-to-one to the analog-digital converted digital signals (i.e., the photosensitive gain signals) output by the analog-to-digital conversion circuit, that is to say, there is a corresponding relationship between time duration and the value of the photosensitive gain signal.

Figure 9:
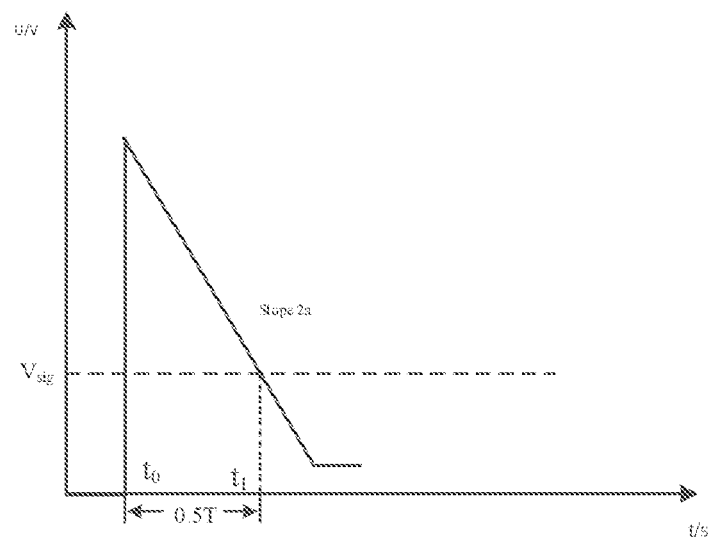
FIG. 9 is a schematic diagram of signal change of an adjusted ramp signal according to the embodiment of the disclosure.

FIG. 9 shows a schematic diagram of the voltage change of the input signal of the comparator module 122 corresponding to the input end of the ramp signal $V_{ramp}$ in the case where the slope of the ramp signal $V_{ramp}$ is adjusted to 2a, and the analog voltage value of the photosensitive electric signal $V_{sig}$ is maintained constant according to the embodiments of the present disclosure. It can be seen that after the elapse of time 0.5 T, the dotted and solid lines in FIG. 9 also intersect. The signal voltages at the two input ends of the comparator module 122 are equal, the output of the comparison module 122 is inverted, and the counter is controlled to stop counting and generates a count value. Therefore, in FIG. 9 the slope of the ramp signal $V_{ramp}$ is increased to change the timing at which the comparator module output signal is inverted, which is equivalent to the effect of FIG. 8 directly amplifying the voltage amplitude of the photosensitive electric signal $V_{sig}$.

Figure 10:
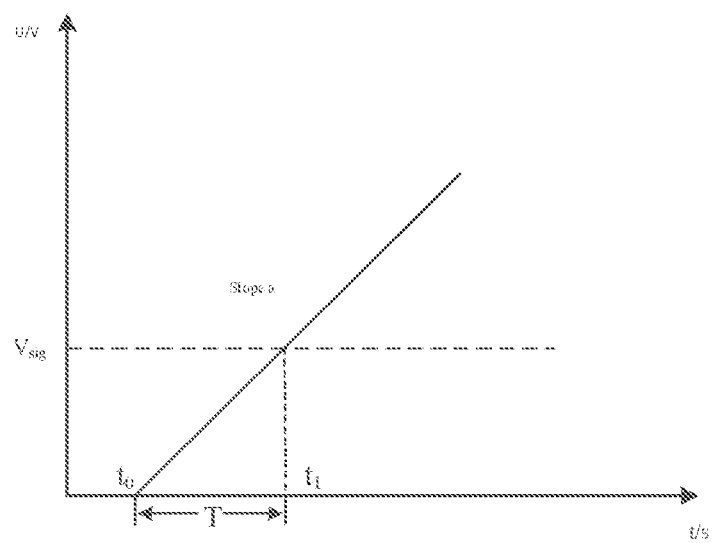
FIG. 10 is a schematic diagram of change of an original signal according to an embodiment of the disclosure.
Figure 11:
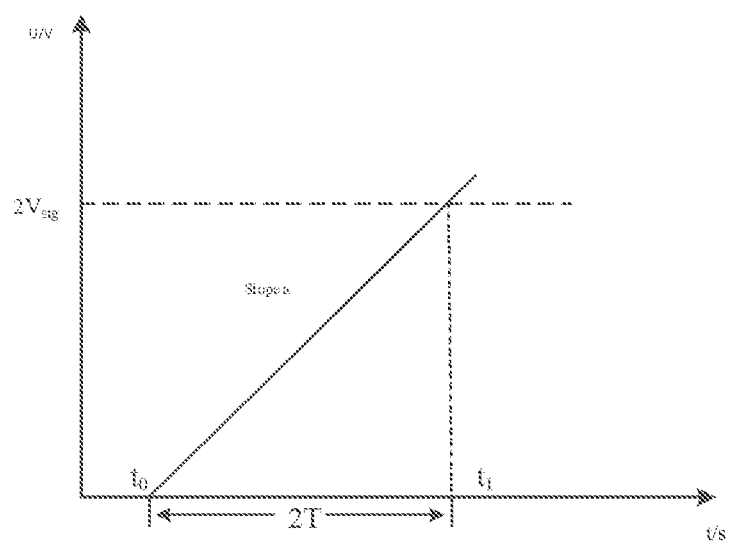
FIG. 11 is a schematic diagram of change of an amplified signal according to an embodiment of the disclosure.
Figure 12:
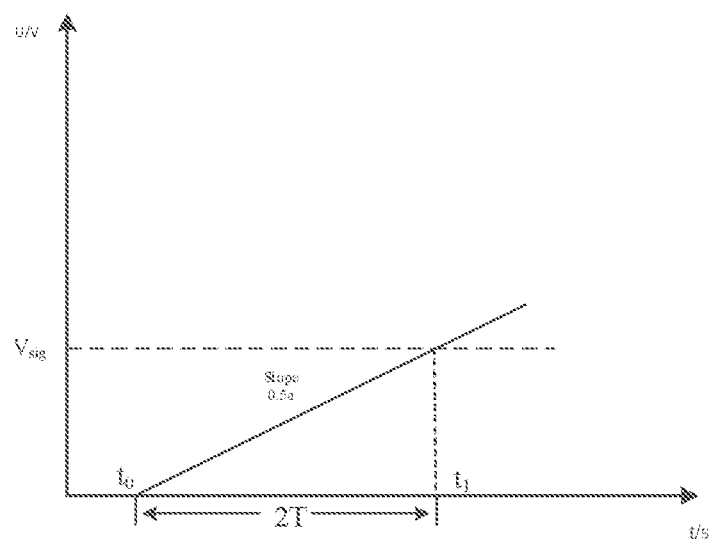
FIG. 12 is a schematic diagram of signal change of an adjusted ramp signal according to the embodiment of the disclosure.

FIGS. 10, 11 and 12 are schematic diagrams in the case where the voltage value of the ramp signal $V_{ramp}$ ramps up with time. Similarly, in FIG. 10, for the original photosensitive electric signal $V_{sig}$, the signal voltages at the two input ends of the comparator module 122 are equal after the time T has elapsed. In FIG. 11, for the photosensitive electric signal $2V_{sig}$ amplified twice, the signal voltages at the two input ends of the comparator module 122 are equal after time 2T has elapsed. In FIG. 12, for the ramp signal $V_{ramp}$ with the slope of 0.5a, the signal voltages at the two input ends of the comparator module 122 are equal after the time 2T has elapsed, which is equivalent to the effect of FIG. 11 directly amplifying the photosensitive electric signal $V_{sig}$ twice.

In practical application, the ramp signal can be selected to be incremented or decremented over time according to the requirement, which is not limited herein.

Based on the above signals, it can be seen that the comparator module compares voltages of the photosensitive electric signal $V_{sig}$ and the ramp signal $V_{ramp}$, and an output signal inversion occurs (intersection of the dotted and solid lines) when the two voltages are equal, so as to control a count value of a counter subsequently. That is to say, the column circuit simultaneously performs signal amplitude amplification and analog-to-digital conversion on the photosensitive electric signal $V_{sig}$ through the comparator module and the counter, thereby obtaining the corresponding photosensitive gain signal.

Figure 13:
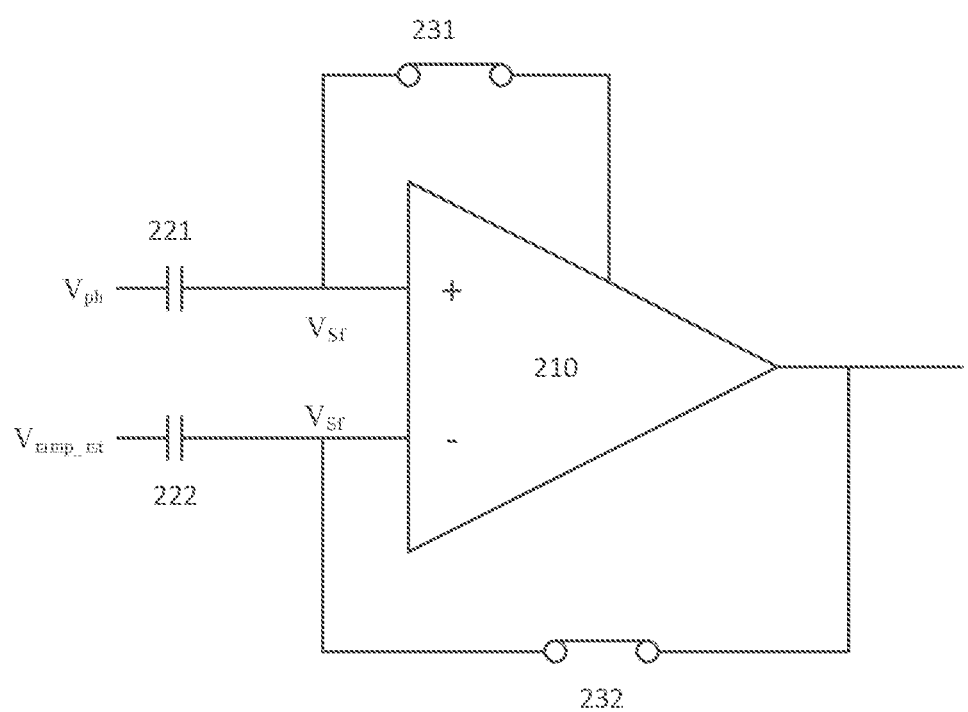
FIG. 13 is a structural schematic diagram of a comparator module according to an embodiment of the disclosure.
Figure 14:
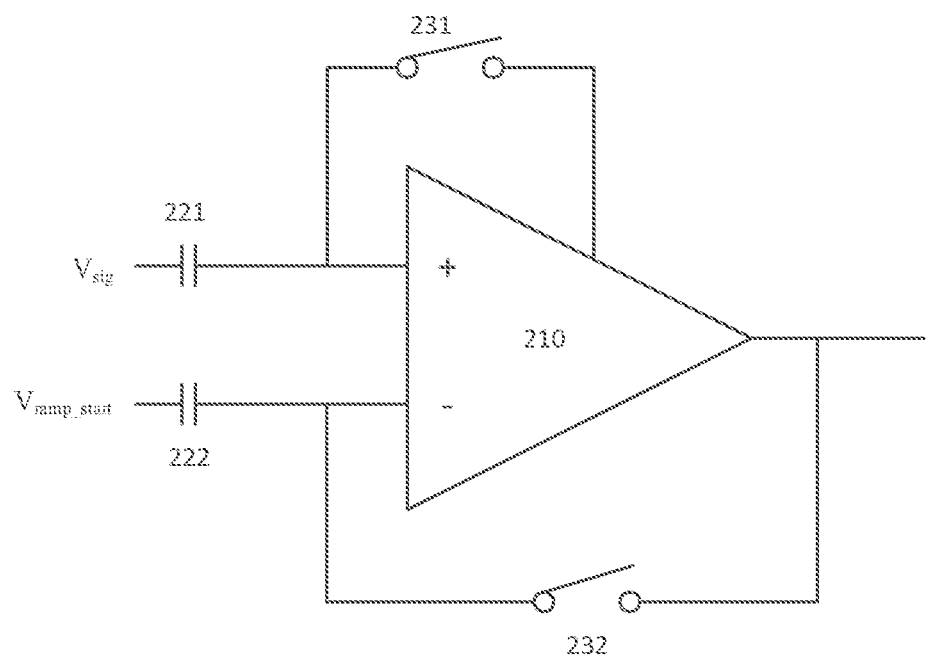
FIG. 14 is a structural schematic diagram of a comparator module according to an embodiment of the disclosure.
Figure 15:
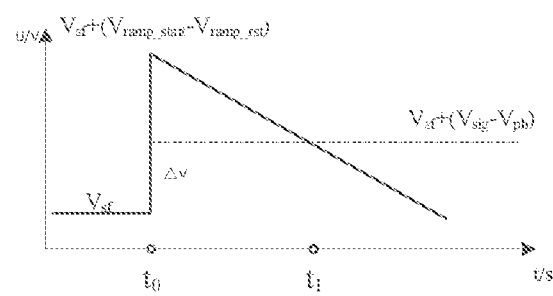
FIG. 15 is a schematic diagram of change of a negative end signal according to an embodiment of the disclosure.

The ways of signal coupling of the comparator module 210 is discussed below. In the embodiment of FIGS. 13 to 14, the comparator module 210 may include a first input end and a second input end. The first input end and the second input end are coupled to the bias voltage $V_{sf}$ during the reset phase, the first input end is coupled to the photosensitive electric signal $V_{sig}$ during the comparison phase, and the second input end is coupled to the ramp signal $V_{ramp}$ during the comparison phase. After the comparison phase starts, the comparator module 210 compares the signal voltages of the two input ends, and is inverted when the voltage value of the ramp signal $V_{ramp}$ equals to the voltage value of the photosensitive electric signal $V_{sig}$. The inversion occurs at the intersection of the dotted line and the solid line in FIG. 15. It should be noted that, in the above embodiments of FIGS. 13 to 14, in the comparison stage, the photosensitive electric signal $V_{sig}$ and the ramp signal $V_{ramp}$ are connected to the positive and negative input ends of the comparator module 210 respectively. The problem with this connection is that since the voltage value of the incoming photosensitive electric signal $V_{sig}$ is different every time the signal is sampled, the jumped amount $\Delta V = V_{sig} - V_{ph}$ in FIG. 15 is not a fixed amount, therefore, the inverted point (intersection of the dotted and solid lines) of the comparator module is not fixed, which requires that the input common-mode range of the comparator module can cover all the cases, thus increasing the design difficulty of the comparator module.

In order to solve the above problems, the comparator module in some other embodiments includes a first input end and a second input end, and the first input end is coupled to a reference voltage $V_{ref}$ (the reference voltage has a fixed level). The second input end is coupled to the photosensitive electric signal $V_{sig}$ in the reset phase and is coupled to the ramp signal $V_{ramp}$ in the comparison phase. The output signal of the comparator module is inverted when a voltage of the signal coupled to the second input end varies to be the same as a voltage of the first input end.

The counting module 230 coupled behind the comparator module 122 is described below.

In an embodiment, the counter is a local counter. That is, each of the analog-to-digital conversion circuits 120 has a counting module 123 (as shown in FIG. 1) inside for performing counting according to the clock signal.

The counting module 123 may start counting at an initial time point ($t_0$) of the comparison phase for the comparator module 122, output a corresponding clock signal(s), and ends the counting to obtain a corresponding count value when the output signal of the comparator module 122 is inverted (time point $t_1$), then the count value may be used to reflect a time length T between the start time point $t_0$ of the comparison phase and the time point $t_1$ at which the voltages of the photosensitive electric signal $V_{sig}$ and the ramp signal $V_{ramp}$ are equal. Correspondingly, the count value may be stored in a register corresponding to the counting module 123.

Specifically, the counting module 123 obtains a first count value according to a duration from an initial time point when the ramp signal $V_{ramp}$ is generated to a time point when the output signal of the comparator module 122 is inverted, and outputs a first digital signal corresponding to the photosensitive electric signal $V_{sig}$ according to the first count value.

Since the first digital signal corresponding to the photosensitive electric signal $V_{sig}$ obtained by the analog-to-digital conversion circuit 120 cannot intuitively reflect the optical signal intensity of the corresponding light, in an embodiment of the present disclosure, correlated double sampling (CDS) is further performed, in which the output signal of each pixel unit contains not only the photosensitive electric signal but also the reset electric signal, and the output signal is sampled at an integration start time and an the integration end time, respectively (in a signal output period, two sampling pulses are generated to respectively sample two levels of the output signal, that is, one is to sample the reset electric signal, and the other is to sample the photosensitive electric signal), in addition, the time interval between two times of sampling is well controlled, so that the noise voltages of two times of sampling are almost the same, and the interference to the reset noise is basically eliminated by subtracting the two sampling values (i.e., a photosensitive gain signal and a reset gain signal), and an actual effective amplitude of the signal level is obtained. That is, the correlated double sampling (CDS) according to embodiments of the disclosure is performed in the digital domain by calculating a difference between the photosensitive gain signal and the reset gain signal as the digital sampling signal.

Therefore, in order to obtain a signal that can intuitively describe the optical signal, the comparator module may be coupled to the reset signal and the ramp signal $V_{ramp}$ sequentially, and is inverted when a difference between the ramp signal $V_{ramp}$ and the reset electric signal changes to zero. The reset electric signal may be a signal output at an initial time point when the pixel unit starts to perform photoelectric conversion, and the influence of illumination on the signal may be determined by comparing the signal at the time point with the photosensitive gain signal.

Correspondingly, the counting module 123 obtains a second count value according to a duration from an initial time point when the ramp signal $V_{ramp}$ is generated to a time point when the comparator module 122 is inverted, and outputs a second digital signal corresponding to the reset electric signal according to the second count value. The second digital signal is used to describe the output signal corresponding to the pixel unit without any optical signal.

In this embodiment, the optical sensing system may also include a digital logic circuit. The digital sampling signal is determined according to a difference between the first digital signal and the second digital signal, and is used for intuitively describing the optical parameters of the optical signal.

The digital logic circuit calculates a difference between the first digital signal and the second digital signal, and takes the difference as a digital sampling signal. The optical parameters, such as light intensity, light frequency, etc., of the lights received by the pixel unit can be described or reflected by the digital sampling signal.

Correspondingly, after obtaining the digital sampling signal, the corresponding processing module in the optical sensing system can also synthesize the digital sampling signals corresponding to the pixel units, perform corresponding image processing and generation, thus, effects such as image capturing and fingerprint recognition are realized.

In some embodiments, to reduce the chip area overhead, the counting module 123 may include a global counter and a plurality of storage units, i.e., only one global counter is provided in the optical sensing system. In order for the global counter to be adapted to the count values respectively corresponding to different analog-to-digital conversion circuits 120, each analog-to-digital conversion circuit 120 respectively corresponds to a storage unit for storing a corresponding count value output by the global counter. Correspondingly the global counter counts the count values corresponding to the photosensitive electric signals generated by the pixel units of each column, and when the plurality of comparator modules in the plurality of column circuits are inverted respectively, the count values corresponding to the respective comparator modules are stored in the corresponding storage units, respectively. Each of the column circuits can respectively realize generation of the corresponding photosensitive gain signal according to the count value in the respective storage unit. Since the clock signal generated by the global counter does not affect the processing logic of different analog-to-digital converters, the chip area can be effectively reduced while ensuring the system performance.

In some embodiments, correspondingly, only one global ramp generator may be provided in the optical sensing system, and the ramp signal generator may not be separately provided in each of the analog-digital conversion circuits 120. The global ramp generator is configured to generate a ramp signal $V_{ramp}$ and transmit the ramp signal $V_{ramp}$ to the comparator module 122 in each of the analog-to-digital conversion circuits 120, respectively. Through the design of the global ramp generator, the chip area can also be reduced effectively.

Referring back to FIG. 1, the ramp signal generator 121 is a global ramp generator, i.e., only one global ramp generator 121 needs to be provided in the optical sensing system. The global ramp generator 121 is configured to generate a ramp signal $V_{ramp}$ and transmit the ramp signal $V_{ramp}$ to the column circuits 131 to 133, respectively. Through the design of the global ramp generator 121, the chip area can also be reduced effectively.

The digital logic circuit 140 may calculate a digital sampling signal using the photosensitive gain signals after receiving the photosensitive gain signals as a result of the analog-to-digital conversion performed by the column circuits 131 to 133, and the digital sampling signal can be used to reflect the optical signal intensity of the corresponding light.

Because the photosensitive gain signal alone may not reflect the comparison result between before and after illumination, that is, the optical signal intensity of the light corresponding to the photosensitive gain signal cannot be directly determined. In an embodiment of the disclosure, correlated double sampling (CDS) is further performed, in which the output signal of each pixel unit contains not only the photosensitive electric signal but also the reset electric signal, and the output signal is sampled at an integration start time and an integration end time, respectively (in a signal output period, two sampling pulses are generated to respectively sample two levels of the output signal, that is, one is to sample the reset electric signal, and the other is to sample the photosensitive electric signal), in addition, the time interval between two times of sampling is well controlled, so that the noise voltages of two times of sampling is almost the same, and the interference to the reset noise is basically eliminated by subtracting the two sampling values (a photosensitive gain signal and a reset gain signal), and the actual effective amplitude of the signal level is obtained. That is, the correlated double sampling (CDS) according to an embodiment of the disclosure is performed in the digital domain by calculating the difference between the photosensitive gain signal and the reset gain signal as the digital sampling signal.

The reset gain signal may be a digital signal obtained after the column circuit samples the reset electric signal. The reset electric signal may be a signal output at an initial time point when the pixel unit starts to perform photoelectric conversion, and the aforementioned correlated double sampling can be implemented by comparing the signal at the initial time point with the photosensitive gain signal. The specific process of sampling (including gain amplification and analog-to-digital conversion) the reset electric signal can refer to the description of the process of amplifying the photosensitive electric signal $V_{sig}$ in the above steps, which is not described here.

The digital logic circuit 140 calculates the difference between the photosensitive gain signal and the reset gain signal, and takes the difference as a digital sampling signal, so as to determine the light signal intensity of the light received by the pixel unit this time according to the difference.

Correspondingly, after obtaining the digital sampling signal, the corresponding processing module in the optical sensing system can also synthesize the digital sampling signals corresponding to the pixel units, perform corresponding image processing and generation, thus, effects such as image capturing and fingerprint recognition are realized.

The optical sensing system can be applied to a fingerprint detection device which, for example, can be set on a specific device such as a smart phone or a door entrance guard, so as to realize user identity authentication, thereby protecting the information security of the user. In practical application, the optical sensing system can also be applied to other devices to realize image sensing, which is not limited to the above examples.

Figure 16:
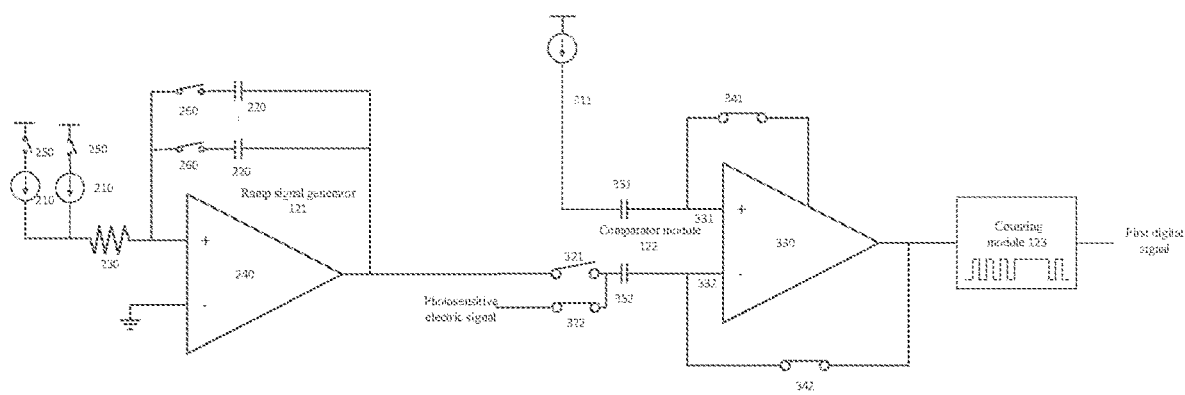
FIG. 16 is a structural schematic diagram of an analog-to-digital conversion circuit according to an embodiment of the disclosure.

It should be noted that, in practical application, the analog-to-digital conversion circuit 120 may not be limited to the application in the optical sensing system, but may be applied to other systems or functional modules as a separate module. For example, as shown in FIG. 16, the analog-to-digital conversion circuit 120 may include a circuit formed by connecting the ramp signal generator 121, the comparator module 122 and the counting module 123 described above. The analog-to-digital conversion of the photosensitive electric signal $V_{sig}$ can be realized by inputting the photosensitive electric signal $V_{sig}$ into the comparator and finally outputting the first digital signal through the counting module. In some embodiments, the amplification factor of the first digital signal compared to the digital signal corresponding to the photosensitive electric signal $V_{sig}$ may also be adjusted based on the slope of the ramp signal $V_{ramp}$.

When the analog-to-digital conversion circuit 120 is used alone to realize analog-to-digital conversion, the format of the signal to be input to the analog-to-digital conversion circuit 120 may not be limited to the photosensitive electric signal $V_{sig}$ shown in the figure, which is not described here.

As can be seen from the above description of the embodiments, the optical sensing system controls an amplification factor of the photosensitive electric signal based on a slope of the ramp signal generated by the ramp signal generator, such that the column circuit is capable of generating a photosensitive gain signal according to the ramp signal and the photosensitive electric signal, the amplification of the signal intensity can be achieved without additionally providing a PGA, and the photosensitive gain signal can eventually be used to calculate a digital sampling signal to determine the corresponding optical signal intensity. In the above described system, the PGA is removed while the signal amplification effect can be obtained, and the structure of the optical sensing system can be simplified, so that the corresponding area overhead of the chip in the optical sensing system can be reduced, the application range of the corresponding optical sensor chip can be improved, and the realization effect in the subsequent image processing can be ensured.

In addition, in the optical sensing system, after the photosensitive electric signal and the ramp signal are generated by the pixel array and the analog-to-digital conversion circuit respectively, the comparator module adopts a way of coupling the photosensitive electric signal and the ramp signal sequentially/separately, such that the output signal is inverted when a difference between the ramp signal and the photosensitive electric signal changes to zero. There is no high relevancy between the voltage values of the input signal of the comparator module and the photosensitive electric signal and the ramp signal, it is thus possible to adjust an input signal voltage value corresponding to the timepoint at which the output signal is inverted based on the common-mode range of the comparator module, and it is possible to ensure that each signal inversion corresponds to the input signal voltage value. Correspondingly, the counting module is also capable of obtaining a first count value according to a duration from an initial time point at which the ramp signal is generated to a time point when the comparator module is inverted, and outputting a first digital signal corresponding to the photosensitive electric signal based on the first count value, so as to achieve an analog-to-digital conversion. Through the optical sensing system described above, the design difficulty of the comparator module can be reduced, the accuracy of the analog-to-digital conversion process can be guaranteed, and the realization effect of the subsequent image processing can be ensured.

Figure 17:
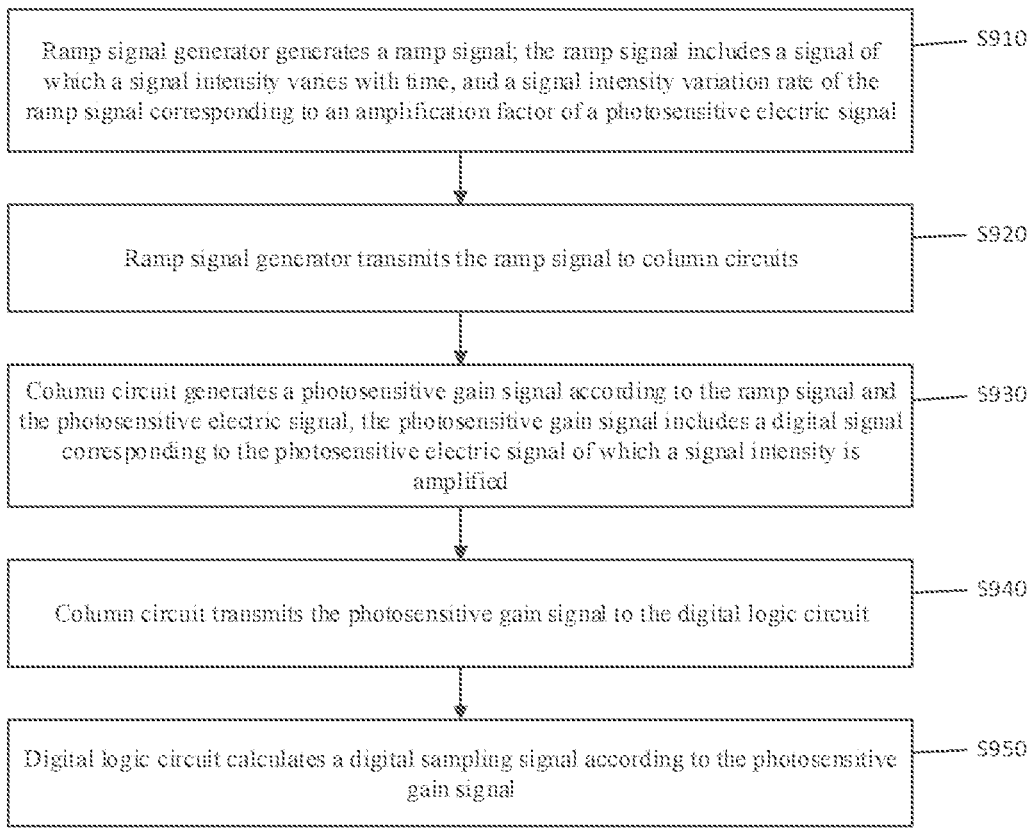
FIG. 17 is a flowchart of a digital signal calculation method according to an embodiment of the disclosure.

Based on the above optical sensing system, embodiments of the present disclosure further provide a method for calculating a digital sampling signal. The method for calculating a digital sampling signal is implemented based on the optical sensing system. As shown in FIG. 17, the method for calculating a digital sampling signal may comprise the following specific implementation steps:

S910: generating, by a ramp signal generator, a ramp signal, wherein the ramp signal includes a signal of which a signal intensity varies with time, and a signal intensity variation rate of the ramp signal corresponds to an amplification factor of a photosensitive electric signal;

S920: transmitting, by the ramp signal generator, the ramp signal to a column circuit;

S930: generating, by the column circuit, a photosensitive gain signal according to the ramp signal and the photosensitive electric signal; wherein the photosensitive gain signal includes a digital signal corresponding to the photosensitive electric signal of which a signal intensity is amplified;

S940: transmitting, by the column circuit, the photosensitive gain signal to the digital logic circuit; and S950: calculating, by the digital logic circuit, a digital sampling signal according to the photosensitive gain signal.

The digital logic circuit may calculate a digital sampling signal using the photosensitive gain signal after receiving the photosensitive gain signal, and the digital sampling signal can be used to reflect the optical signal intensity of the corresponding light.

Although the process flow described above includes multiple operations occurring in a particular order, it should be clear that these processes may include more or less operations, these operations may be performed sequentially or in parallel (e.g., using a parallel processor or multi-threaded environment).

Although the process flow described above includes multiple operations occurring in a particular order, it should be clear that these processes may include more or less operations, these operations may be performed sequentially or in parallel (e.g., using a parallel processor or multi-threaded environment).

The present application is described with reference to flow diagrams and/or block diagrams of the method, the device (system) and the computer program product according to the embodiment of the present disclosure. It should be understood that each flow and/or block in the flow diagrams and/or block diagrams, and the combination of the flows and/or blocks in the flow diagrams and/or block diagrams can be achieved by computer program commands. These computer program commands can be provided to a CPU of a general-purpose computer, a special-purpose computer, an embedded processor or other programmable data processing device to produce a machine, so that a device for achieving functions designated in one or more flows in the flow diagrams and/or one or more blocks in the block diagrams can be generated by the command executed by the CPU of the computer or other programmable data processing device.

These computer program instructions can also be stored in a computer-readable memory that can guide a computer or other programmable data processing device to operate in a special way, so that the instruction stored in the computer-readable memory generates a manufactured product including an instruction device which achieves functions designated in one or more flows in the flow diagrams and/or one or more blocks in the block diagrams.

These computer program instructions can also be loaded on a computer or other programmable data processing device, on which a series of operation steps are executed to generate processing achieved by the computer, so that the instruction executed on the computer or other programmable data processing device is provided for being used in the steps of achieving functions designated in one or more flows in the flow diagrams and/or one or more blocks in the block diagrams.

In a typical configuration, a computing device includes one or more processors (CPUs), input/output interfaces, network interfaces, and a memory.

The memory, which may have the form of a volatile memory, a Random-Access Memory (RAM) and/or a non-volatile memory such as Read-Only Memory (ROM) or a flash RAM, etc. among the computer readable medium. The memory is an example of the computer readable medium.

The computer-readable medium includes permanent and non-permanent, removable and non-removable media, which can realize the information storage in any method or technique. The information can be computer readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storages, magnetic cassette tapes, magnetic diskettes or other magnetic storage device, or any other non-transmission medium, which can be used for the storage of information accessible to a computing device. According to the definitions herein, the computer readable medium does not include any temporary computer readable media (transitory media), such as modulated data signal and carrier wave.

Persons skilled in the art shall understand that, the embodiments of the present disclosure can be provided as a method, a system or a computer program product. Therefore, the embodiments of the present disclosure can adopt the forms of a full hardware example, a full software example, or combination of a software example and a hardware example. Moreover, the embodiments of the present disclosure can adopt the form of a computer program product that is implemented on one or more computer-usable storage medium (including but not limited to a disk memory, a CD-ROM, an optical memory, and etc.) including computer-usable program codes.

The embodiments of the present disclosure may be described in the general context of computer executable instructions executed by the computer, e.g., the program module. In general, the program module includes a routine, a program, an object, a component, a data structure, etc. executing a particular task or realizing a particular abstract data type. The embodiments of the present disclosure may also be put into practice in the distributed computing environments where tasks are executed by remote processing devices connected through a communication network. In the distributed computing environments, the program modules may be located in the local and remote computer storage medium including the storage device.

The various embodiments in the disclosure are described in a progressive manner, and the same or similar parts between the various embodiments may be referred to each other, and each embodiment focuses on the differences from the other embodiments. In particular, the system embodiment is simply described since it is substantially similar to the method embodiment, and please refer to the description of the method embodiment for the relevant content. In the description, reference terms "one embodiment", "some embodiments", "example", "specific example" or "some examples" are used to mean that specific features, structures, materials or characteristics described by combining the embodiment or example are included in at least one embodiment or example in the embodiments of the present disclosure. In the present disclosure, exemplary expression of the above terms does not necessarily refer to the same embodiment or example. Moreover, the described specific features, structures, materials or characteristics may be combined in a suitable manner in any one or more of the embodiments or examples. Furthermore, those skilled in the art can combine different embodiments or examples described in the present disclosure and features of the different embodiments or examples in the case that they are not contradictory to each other.

The above descriptions are only embodiments of the present application and are not intended to limit the application. Various changes and modifications can be made to the present application by those skilled in the art. Any modifications, equivalents, improvements, etc. made within the spirit and scope of the present application are intended to be included within the scope of the claims of the present application.

What is claimed is:

1. An optical sensing system, comprising a ramp signal generator, a digital logic circuit, and a plurality of column circuits;
    wherein the ramp signal generator is configured to generate a ramp signal and transmit the ramp signal to the plurality of column circuits; the ramp signal comprises a signal of which a signal intensity varies with time, and a signal intensity variation rate of the ramp signal is adjustable and is used to adjust an amplification factor of a photosensitive electric signal;
    wherein at least one of the plurality of column circuits is configured to receive the photosensitive electric signal, and output a photosensitive gain signal to the digital logic circuit according to the ramp signal and the photosensitive electric signal; the photosensitive gain signal comprising a digital signal corresponding to the photosensitive electric signal of which a signal intensity is amplified; and
    wherein the digital logic circuit is configured to calculate a digital sampling signal according to the photosensitive gain signal.

2. The optical sensing system according to claim 1, wherein the optical sensing system further comprises a pixel array;
    wherein the pixel array comprises a plurality of rows and columns of pixel units, wherein each of the column circuits corresponds to a column of the pixel units of the pixel array, and
    wherein the pixel units are configured to generate respective photosensitive electric signals according to optical signals that are received, and transmit the photosensitive electric signals to the column circuit.

3. The optical sensing system according to claim 1, wherein the ramp signal generator is configured to generate the ramp signal with different signal intensity variation rates according to different values of a configuration register.

4. The optical sensing system according to claim 1, wherein a capacitor is provided in the ramp signal generator, and a capacitance value of the capacitor is used to adjust the signal intensity variation rate of the ramp signal.

5. The optical sensing system according to claim 1, wherein the ramp signal generator is provided with a current source correspondingly, and a magnitude of a current output by the current source to the ramp signal generator is used to adjust the signal intensity variation rate of the ramp signal.

6. The optical sensing system according to claim 1, wherein each of the column circuits comprises a comparator module, and an output signal of the comparator module is inverted when a voltage difference between the ramp signal and the photosensitive electric signal is zero.

7. The optical sensing system according to claim 6, wherein the comparator module comprises a first input end and a second input end; the first input end is coupled to a reference voltage, and the second input end is coupled to the photosensitive electric signal in a reset phase and is coupled to the ramp signal in a comparison phase; and the output signal of the comparator module is inverted when a voltage of a signal coupled to the second input end varies to be the same as a voltage at the first input end.

8. The optical sensing system according to claim 1, wherein each of the column circuits comprises a comparator module, and an output signal of the comparator module is inverted when the ramp signal is equal to the photosensitive electric signal.

9. The optical sensing system according to claim 8, wherein the comparator module comprises a first input end and a second input end; the first input end and the second input end are coupled to a bias voltage during a reset phase, the first input end is coupled to the photosensitive electric signal during a comparison phase, and the second input end is coupled to the ramp signal during the comparison phase; and an output signal of the comparator module is inverted when a voltage of a signal coupled to the second input end varies to be the same as a voltage at the first input end.

10. The optical sensing system according to claim 6, wherein each of the column circuits further comprises a counter which counts from an initial time point when the ramp signal is generated until the output signal of the comparator module is inverted to obtain a count value, and outputs the photosensitive gain signal according to the count value.

11. The optical sensing system according to claim 6, wherein the optical sensing system further comprises a global counter and a plurality of storage units; the plurality of storage units correspond to the column circuits respectively; the global counter starts counting at an initial time point when the ramp signal is generated, stores a count value corresponding to each comparator module in each of the column circuits in a corresponding storage unit when each comparator module is inverted, and outputs a corresponding photosensitive gain signal according to the corresponding count value.

12. The optical sensing system according to claim 1, wherein the ramp signal generator comprises a global ramp generator, and the global ramp generator is configured to generate the ramp signal and transmit the ramp signal to the column circuits respectively.

13. The optical sensing system according to claim 2, wherein calculating the digital sampling signal according to the photosensitive gain signal comprises:
the column circuit receives a reset electric signal, and outputs a reset gain signal to the digital logic circuit according to the ramp signal and the reset electric signal; the reset electric signal is a signal output at an initial time point when the pixel unit performs photoelectric conversion; and the reset gain signal comprises a digital signal corresponding to the reset electric signal of which a signal intensity is amplified; and
the digital logic circuit calculates a difference between the photosensitive gain signal and the reset gain signal as the digital sampling signal.

14. The optical sensing system according to claim 7, wherein the comparator module further comprises a first self-biasing switch, a second self-biasing switch, a first converting switch, and a second converting switch;
wherein in the reset phase, the first self-biasing switch and the second self-biasing switch are turned on so that the first input end is coupled to the reference voltage, and the first converting switch is turned on and the second converting switch is turned off so that the second input end is coupled to the photosensitive electric signal; and
wherein in the comparison phase, the first self-biasing switch and the second self-biasing switch are turned off, the first converting switch is turned off and the second converting switch is turned on, so that the second input end is coupled to the ramp signal.

15. The optical sensing system according to claim 7, wherein the comparator module further comprises a comparator, a first capacitor and a second capacitor, wherein the first capacitor is coupled between the first input end and a third input end of the comparator, and the second capacitor is coupled between the second input end and a fourth input end of the comparator, wherein in the reset phase, a first electrode plate of the first capacitor is coupled to a bias voltage, a second electrode plate of the first capacitor is coupled to the reference voltage, a first electrode plate of the second capacitor is coupled to the bias voltage, and a second electrode plate of the second capacitor is coupled to the photosensitive electric signal; and
wherein in the comparison phase, signals of the first electrode plate and the second electrode plate of the first capacitor remain unchanged, and the second electrode plate of the second capacitor is switched to be coupled to the ramp signal, then a signal coupled to the first electrode plate of the second capacitor is switched to the bias voltage plus a difference between the ramp signal and the photosensitive electric signal.

16. The optical sensing system according to claim 15, wherein the third input end of the comparator is coupled to the first electrode plate of the first capacitor, and the fourth input end of the comparator is coupled to the first electrode plate of the second capacitor, wherein when the difference between the ramp signal and the photosensitive electric signal changes to zero, a signal at the fourth input end changes to be equal to the bias voltage to which the third input end is coupled, and the comparator is inverted.

17. An optical sensing system, comprising a pixel array and at least one analog-to-digital conversion circuits;
wherein the pixel array comprises a plurality of rows and columns of pixel units, and the pixel units are configured to generate respective photosensitive electric signals according to optical signals that are received;
wherein the analog-to-digital conversion circuit comprises a ramp signal generator, a comparator module and a counting module;
wherein the ramp signal generator is configured to generate a ramp signal and transmit the ramp signal to the comparator module, the ramp signal comprises a signal of which a signal intensity varies with time, and a signal intensity variation rate of the ramp signal is adjustable and is used to adjust an amplification factor of a photosensitive electric signal;
wherein the comparator module is coupled to the photosensitive electric signal and the ramp signal, and an output signal of the comparator module is inverted when a difference between the ramp signal and the photosensitive electric signal changes to zero; and
wherein the counting module obtains a first count value according to a duration from an initial time point when the ramp signal is generated to a time point when the comparator module is inverted, and outputs a first digital signal corresponding to the photosensitive electric signal according to the first count value.

18. The optical sensing system according to claim 17, wherein the optical sensing system further comprises a digital logic circuit,
wherein the comparator module is further coupled to a reset electric signal and the ramp signal, and is inverted when a difference between the ramp signal and the reset electric signal changes to zero;
wherein the counting module obtains a second count value according to a duration from an initial time point when the ramp signal is generated to a time point when the output signal of the comparator module is inverted, and outputs a second digital signal corresponding to the reset electric signal according to the second count value; and wherein the digital logic circuit determines a digital sampling signal according to the difference between the first digital signal and the second digital signal.

19. The optical sensing system according to claim 18, wherein the reset electric signal is a signal output at an initial time point when the pixel unit performs photoelectric conversion.

20. An analog-to-digital converter, comprising a ramp signal generator, a comparator module and a counting module, wherein the ramp signal generator is configured to generate a ramp signal and transmit the ramp signal to the comparator module, wherein the ramp signal comprises a signal of which a signal intensity varies with time, and a signal intensity variation rate of the ramp signal is adjustable and is used to adjust an amplification factor of a photosensitive electric signal;

wherein the comparator module is coupled to the photosensitive electric signal and the ramp signal, and is inverted when a difference between the ramp signal and the photosensitive electric signal changes to zero; and wherein the counting module obtains a first count value according to a duration from an initial time point when the ramp signal is generated to a time point when the comparator module is inverted, and outputs a first digital signal corresponding to the photosensitive electric signal according to the first count value.

* * * * *